(12) United States Patent
Vauchel et al.

(10) Patent No.: US 9,004,855 B2
(45) Date of Patent: Apr. 14, 2015

(54) SIDE-OPENING JET ENGINE NACELLE

(75) Inventors: Guy Bernard Vauchel, Harfleur (FR);
Xavier Cazuc, Le Havre Rouelles (FR)

(73) Assignee: Aircelle, Gonfreville l'Orcher (FR)

( * ) Notice: Subject to any disclaimer, the term of this patent is extended or adjusted under 35 U.S.C. 154(b) by 1343 days.

(21) Appl. No.: 12/446,733

(22) PCT Filed: Sep. 14, 2007

(86) PCT No.: PCT/FR2007/001494
§ 371 (c)(1),
(2), (4) Date: Jul. 12, 2010

(87) PCT Pub. No.: WO2008/053087
PCT Pub. Date: May 8, 2008

(65) Prior Publication Data
US 2010/0284806 A1   Nov. 11, 2010

(30) Foreign Application Priority Data

Oct. 31, 2006  (FR) ..................................... 06 09540

(51) Int. Cl.
*B64D 29/06* (2006.01)
*F01D 25/24* (2006.01)
(Continued)

(52) U.S. Cl.
CPC ................ *B64D 29/08* (2013.01); *B64D 29/06* (2013.01)

(58) Field of Classification Search
CPC ....... F01D 25/24; F01D 25/28; F01D 25/243; F05B 2240/90; F05B 2240/92; F05B 2240/923; F05B 2240/14; F05B 27/26; F05B 27/12; F05B 27/14; F05B 27/18; F05B 27/20; F05B 27/10; F05B 27/16; B64D 29/06; B64D 29/02; B64D 29/04; B64D 29/00; F02C 7/32; B64C 1/14

USPC ........... 415/119, 126, 127, 128, 213.1, 214.1; 416/244 R, 244 A, 246, 31; 244/129.4, 244/129.5, 53 R, 54

See application file for complete search history.

(56) References Cited

U.S. PATENT DOCUMENTS 3,541,794 A   11/1970  Johnston et al.
4,585,189 A *  4/1986  Buxton .......................... 244/54
(Continued)

FOREIGN PATENT DOCUMENTS

FR   2 673 972    9/1992
FR   2 771 710    6/1999
(Continued)

OTHER PUBLICATIONS

International Search Report; PCT/FR2007/001494; Feb. 19, 2008.

*Primary Examiner* — Dwayne J White
*Assistant Examiner* — Joshua R Beebe
(74) *Attorney, Agent, or Firm* — Brinks Gilson & Lione

(57) ABSTRACT

The invention relates to a nacelle including an air intake upstream from the jet engine (1), a medium section surrounding the fan of the jet engine (1), and a downstream section. The nacelle further includes at least one pair of mobile cowlings (3) provided on both sides of a vertical longitudinal symmetry plane of the nacelle and hinged essentially parallel to a longitudinal axis (A) of the nacelle so they can be opened to provide access to the jet engine (1). The mobile cowlings (3) are paired by fastening means (8) so that they can be hinged on each other about separate or overlapping axes (6). Each mobile cowling (3) comprises permanent connection means or means (14, 15) for connecting it temporarily by rotation and in closed position to a fixed structure (7) of the nacelle.

15 Claims, 7 Drawing Sheets

(51) Int. Cl.
*B64C 1/14* (2006.01)
*B64D 29/08* (2006.01)

(56) References Cited

U.S. PATENT DOCUMENTS

| | | | | |
|---|---|---|---|---|
| 4,613,099 A | * | 9/1986 | Smith et al. | 244/53 R |
| 4,697,763 A | * | 10/1987 | Vermilye | 244/129.4 |
| 5,350,136 A | * | 9/1994 | Prosser et al. | 244/129.4 |
| 5,518,206 A | * | 5/1996 | Arnold et al. | 244/129.4 |
| 5,603,471 A | * | 2/1997 | Armstrong | 244/53 R |
| 5,915,765 A | * | 6/1999 | Sternberger | 292/256.69 |
| 6,032,901 A | * | 3/2000 | Carimali et al. | 244/129.4 |
| 6,227,485 B1 | * | 5/2001 | Porte | 244/54 |
| 6,334,588 B1 | * | 1/2002 | Porte | 244/129.4 |
| 6,666,408 B1 | * | 12/2003 | De Carvalho et al. | 244/129.4 |
| 6,824,175 B2 | * | 11/2004 | Porte | 292/113 |
| 7,090,165 B2 | * | 8/2006 | Jones et al. | 244/53 R |
| 2006/0038410 A1 | * | 2/2006 | Pratt et al. | 292/144 |

FOREIGN PATENT DOCUMENTS

| | | |
|---|---|---|
| FR | 2 772 342 | 6/1999 |
| FR | 2 855 497 | 12/2004 |

* cited by examiner

FIG.5
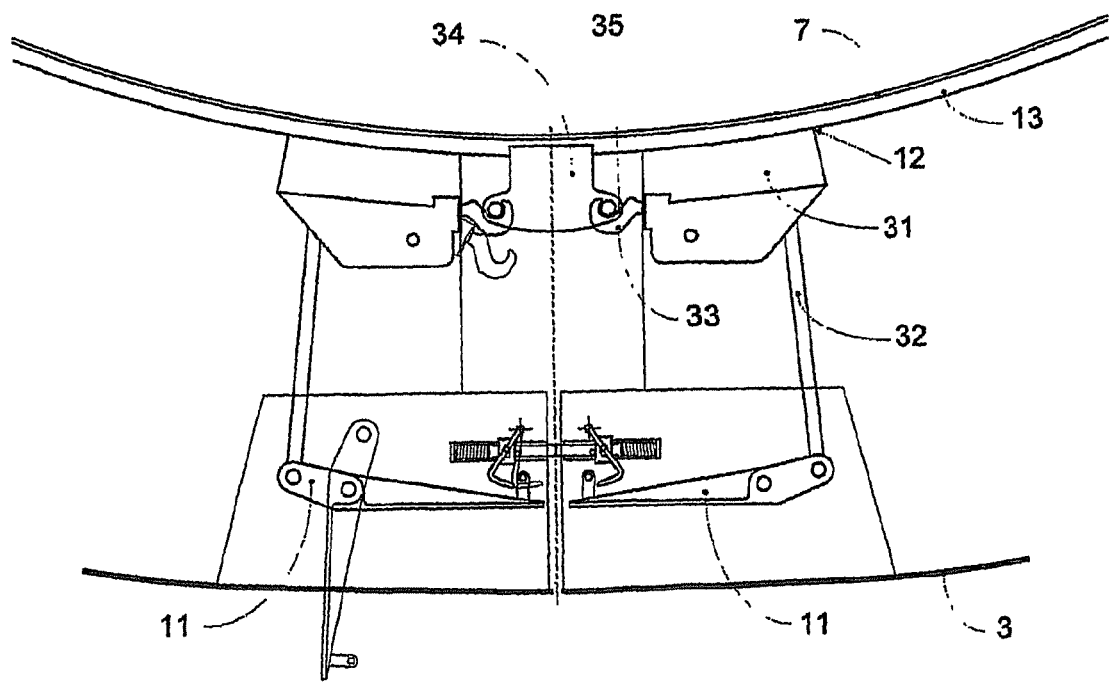
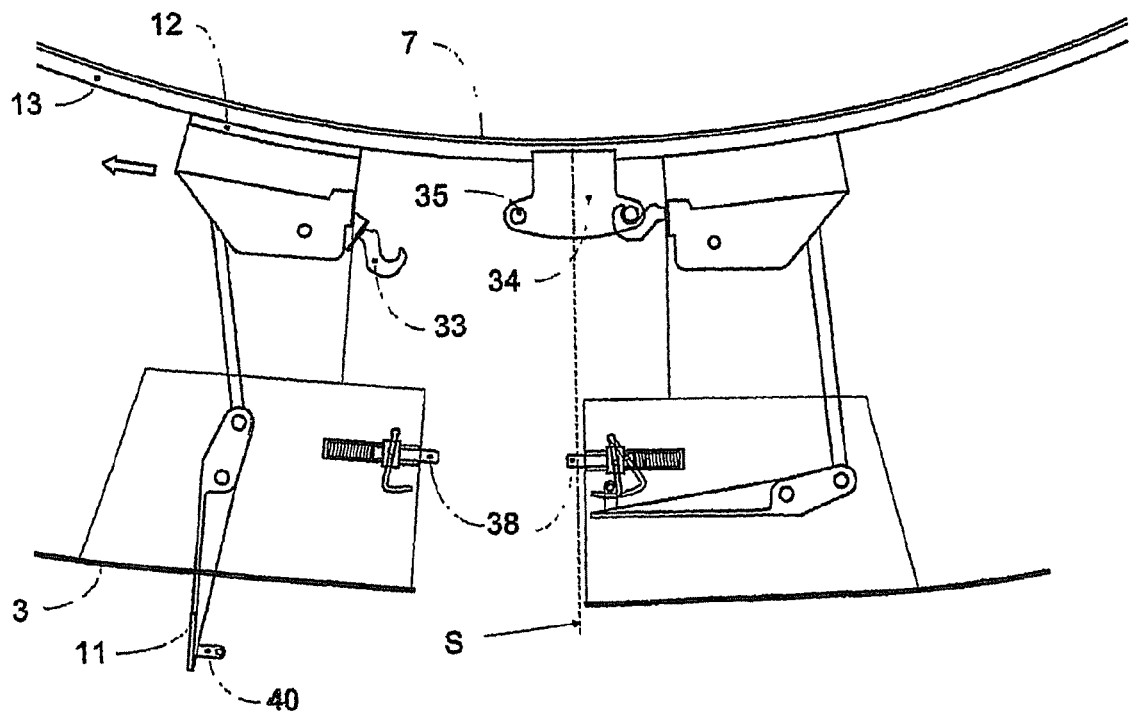
FIG.6

SIDE-OPENING JET ENGINE NACELLE

FIELD OF THE INVENTION

The present invention relates to a jet engine nacelle.

BACKGROUND OF THE INVENTION

An aircraft is propelled by a number of jet engines each housed in a nacelle which also houses a collection of ancillary actuating devices associated with operation thereof, such as a thrust reverser device, and which performs various functions when the jet engine is running or shut down.

A nacelle generally has a tubular structure comprising an air intake upstream of the jet engine, a median section intended to surround a fan of the jet engine, a downstream section housing thrust reverser means and intended to surround the combustion chamber of the jet engine, and generally ends in a jet pipe the outlet of which is situated downstream of the jet engine.

Modern nacelles are designed to house a bypass jet engine capable, via the blades of the rotating fan, of generating a stream of hot air (also known as the primary stream) that comes from the jet engine combustion chamber, and a stream of cold air (the secondary or bypass stream) which flows around the outside of the jet engine through an annular passage also known as a duct, formed between a jet engine cowling (or an internal structure of the downstream structure of the nacelle and surrounding the jet engine) and an internal wall of the nacelle. The two air streams are ejected from the jet engine at the rear of the nacelle.

Each power plant of the aircraft is therefore formed of a nacelle and of a jet engine, and is suspended from a fixed structure of the aircraft, for example under a wing or on the fuselage, by a pylon or strut attached to the jet engine or to the nacelle.

The nacelle is generally fitted with mobile cowls which can open to provide access to the jet engine during maintenance operations. These mobile cowls are generally situated in the median section surrounding the fan or gas generator of the jet engine where they may incorporate a thrust reverser device.

Usually, these cowls have a curvature tailored to the surroundings of the jet engine allowing it to fit into the nacelle and ensuring its aerodynamic continuity in the closed position. They are generally attached to the pylon that supports the nacelle by attachment means allowing them to be articulated about an axis substantially parallel to a longitudinal axis of the nacelle and having a lower edge equipped with locking means able to keep them in the closed position during flight operations. The operation of opening the cowls is performed once the locking means have been opened up by pivoting them about the attachment means secured to the pylon.

The pylon thus acts as a bearing fixed structure for the pivot axes about which the cowls are articulated.

However, in certain aircraft power plant configurations, there is no fixed structure available above the nacelle to act as a support for the pivot axes about which the mobile cowls are articulated. It then becomes difficult, if not impossible, to access the jet engine without, for example, having to resort to cumbersome maintenance tooling to remove the mobile cowls.

BRIEF DESCRIPTION OF THE INVENTION

The present invention is aimed at avoiding these disadvantages and its subject is therefore a nacelle for a jet engine comprising an air intake upstream of the jet engine, a median section intended to surround a fan of the jet engine and a downstream section, the nacelle further comprising at least one pair of mobile cowls positioned one on each side of a longitudinal vertical plane of symmetry of the nacelle and articulated substantially parallel to a longitudinal axis of the nacelle so that they can open to give access to the jet engine, and in which the mobile cowls are paired with attachment means that allow them to be articulated to one another about separate or coincident axes, and in which each mobile cowl comprises means of permanent connection or means for connecting it temporarily, when closed, in terms of rotation to a fixed structure of the nacelle.

Thus, the idea underlying the invention is to articulate the mobile cowls to one another and to connect each cowl in terms of rotation to the nacelle permanently or only when the cowl is closed, so that there is no risk of it pivoting about the longitudinal axis of the nacelle under the weight of the open other cowl.

The mobile cowls may be positioned in the median section of the nacelle.

The mobile cowls may also be positioned in the downstream section of the nacelle. The downstream section of the nacelle comprises, for example, a thrust reverser device.

Said fixed structure of the nacelle is, for example, a casing intended to surround the fan of the jet engine.

Said means of permanent connection may comprise a support, fixed to the nacelle fixed structure and which bears the pivot axes about which the cowls are articulated. The pivot axis about which the cowl is articulated is created, for example, between the support and an attachment connecting the two cowls, said attachment being connected to the structure of the jet engine by means of at least one, and preferably two supporting link rods.

Each cowl may be connected to the nacelle fixed structure by a knife edge formed in a structure of the cowl and a peripheral groove formed in the nacelle fixed structure, and said means of temporary connection in terms of rotation may comprise a cutout created in the knife edge and designed to accept a stop-forming projecting part created in the peripheral groove.

The positions of the cutout and of the corresponding stop are determined, for example, such that a clearance between the cutout and the stop is coplanar with the pivot axis about which the cowl is articulated, and thus reduced to a minimum.

According to one possibility, said means of temporary connection in terms of rotation comprise a locking bolt which is slidably mounted in a structure toward the upper part of each cowl, parallel to the axis about which it is articulated, between a retracted position and a position of engagement in a retaining orifice of appropriate shape formed in the nacelle fixed structure, and an indexing slide of elongate shape is mounted such that it can move between said retaining orifices in the upper part of the nacelle fixed structure and comprises means which, should a locking bolt become withdrawn from its retaining orifice, immobilize the locking bolt of the other cowl in the engaged position thus preventing simultaneous opening of both cowls.

The locking bolt of each cowl is, for example, able to engage in a through-hole made at each end of the slide and to tension elastic return means of the slide so that withdrawal of one of the locking bolts causes the slide to effect a translational movement toward the locking bolt of the cowl that has remained closed and causes the latter to become immobilized by means of a blocking pin projecting from a proximal wall of the corresponding through-hole and able to engage in a transverse opening in the locking bolt.

These arrangements ensure that the cowl locking system is indexed to prevent the two cowls from opening simultaneously, it being impossible for the cowl that has remained closed to pivot because it is connected to the fan casing.

According to one possibility, said means of temporary connection in terms of rotation comprise a locking hook which is mounted in a structure in the lower part of each cowl and articulated parallel to the cowl, the locking hook being designed to catch, when the cowl is closed, on an anchoring base fixed to the nacelle fixed structure, the pivoting of the locking hook being brought about by a cowl opening lever mounted to pivot between open and closed positions in a space in the lower part of the cowl, and a blocking hook is pivot mounted and designed to catch on a suitably-shaped radial end of the lever with a view to immobilizing the latter in the closed position, the pivoting of the blocking hook being triggered by a signaling member able to signal the fact that one or other of the cowls is open.

Each cowl comprises, for example, toward the lower part a cowl-open signaling rod mounted such that it can move in terms of translation under the action of a return spring between a position in which it is retracted and a position in which it projects with respect to a longitudinal vertical plane of symmetry of the nacelle, the signaling rods of the two cowls coming, when these cowls are closed, to rest against one another so as to keep one another in the retracted position, and said blocking hook exhibits a lateral guide pin mounted to slide in an oblong guide slot formed in the rod so that a translational movement of the rod is accompanied by a pivoting of the blocking hook.

According to another aspect of the invention, the cowls may be articulated by articulation clevises about a common pivot axis, and a mobile cowling device supported above the common pivot axis and connected to the articulation clevises of the cowls by a collection of interlaced pivot link rods may cover the region in which the cowls are articulated and provides a joint between the external walls of the cowls so as to preserve the aerodynamics of the nacelle when the cowls are closed.

BRIEF DESCRIPTION OF THE DRAWINGS

Implementation of the invention will be better understood with the aid of the detailed description which is set out hereinbelow with reference to the attached drawing in which:

FIGS. 5 and 6 are two views of the rear face of a nacelle according to the invention illustrating two operating positions of another device for locking the opening of the mobile cowls of the nacelle.

DETAILED DESCRIPTION OF THE PREFERRED EMBODIMENTS

Figure 1:
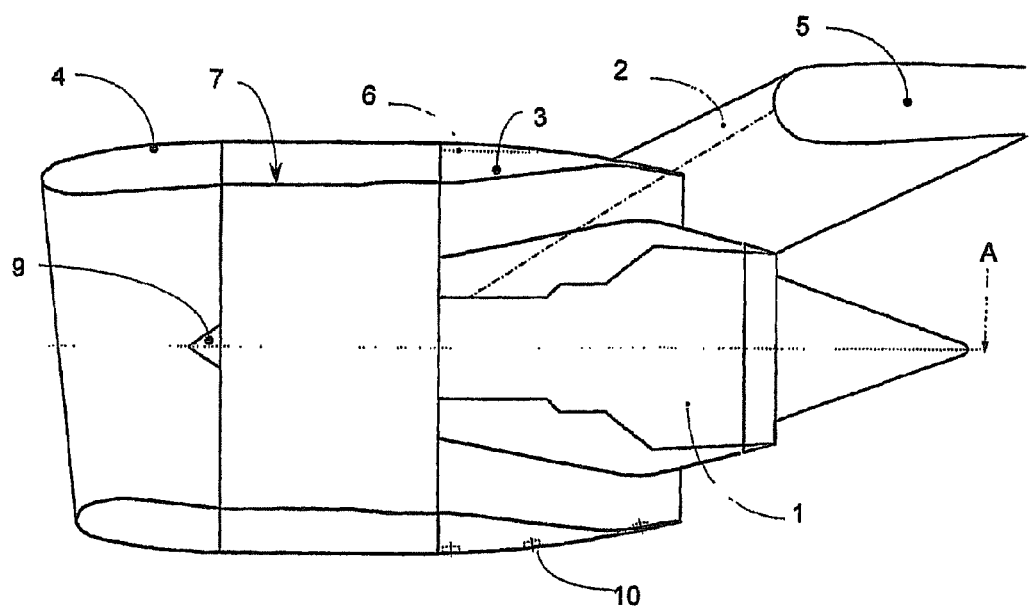
FIG. 1 is a schematic view in longitudinal section of a nacelle according to the invention.

FIG. 1 depicts an aircraft power plant comprising a nacelle which constitutes a tubular housing for a bypass jet engine 1 and serves to duct the hot and cold air streams that it generates.

The nacelle has a structure comprising a front section 4 forming an air intake, a median section of which an internal casing 7 surrounds the fan 9 of the jet engine 1, and a rear section surrounding the jet engine 1 and equipped with two mobile thrust reverser cowls 3.

The mobile cowls 3, of substantially semi-cylindrical overall shape, are each articulated about an axis 6 substantially parallel to a longitudinal axis A of the nacelle so that they can open to provide access to the jet engine 1 for maintenance operations, and they have a lower edge with opening handles 10.

The jet engine 1 is suspended from a wing 5 of the aircraft by means of a pylon or strut 2 attached to the jet engine 1 in its forward part.

Figure 2:
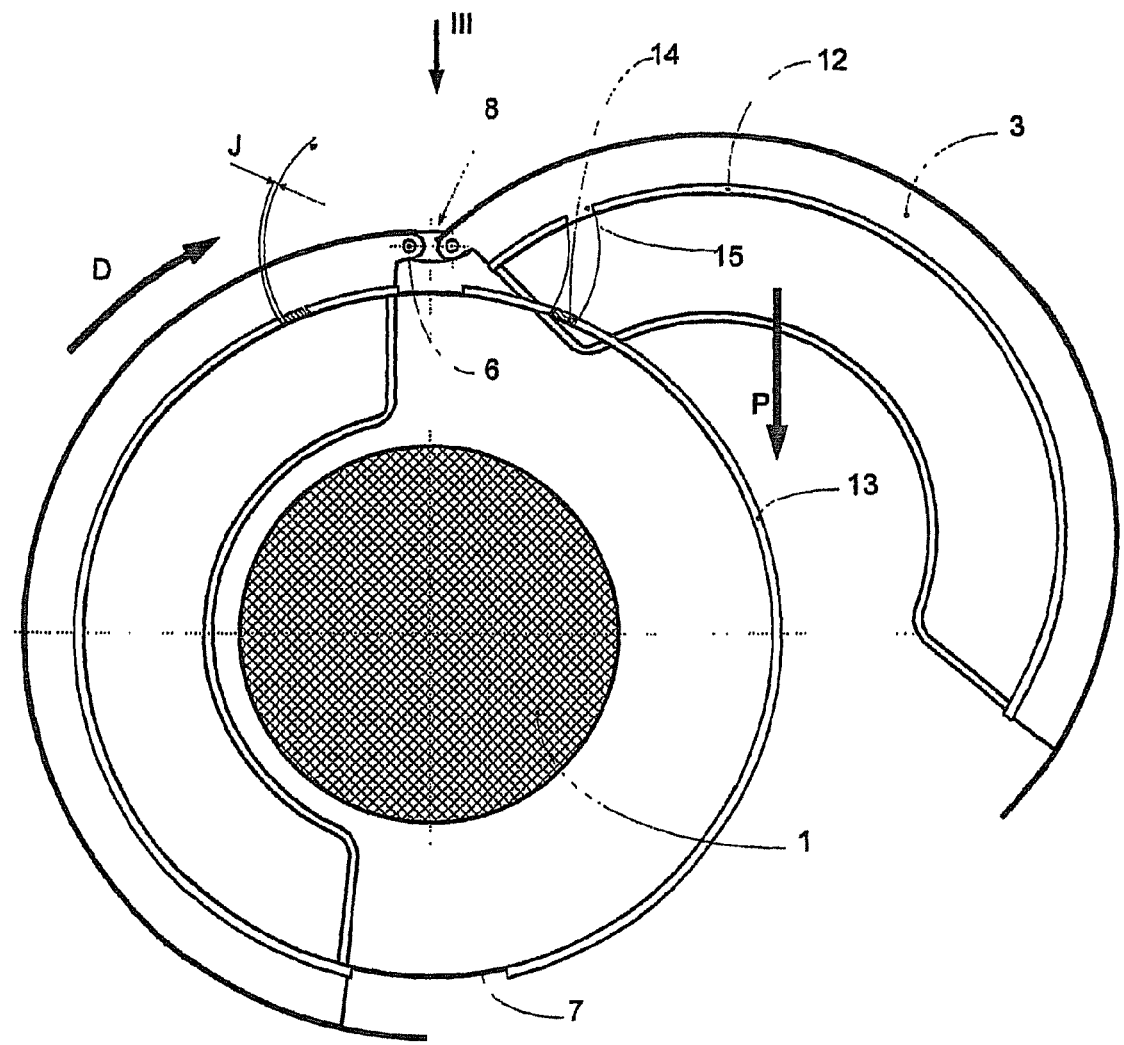
FIG. 2 is a view of the rear face of a nacelle according to a first embodiment of the invention.

In this configuration, because no fixed structure is available above the nacelle to support the pivot axes 6 about which the mobile cowls 3 are articulated, the two cowls 3 are, in a first embodiment of the invention depicted in FIG. 2, attached to one another by attachment fittings 8 allowing them to pivot about distinct or coincident pivot axes 6.

A connection between each reverser mobile cowl 3 and the jet engine 1 is provided between a knife edge 12 provided in the upstream part of the cowl 3 and a peripheral groove 13 formed downstream of the fan casing 7.

When one of the mobile cowls 3 is raised and opened, its weight P tends to cause the other cowl 3, which has remained closed, to rotate in a direction D about the longitudinal axis A. In order to avoid any risk of the closed cowl 3 pivoting, the knife edge 12 of the cowl 3 has a pocket cutout 15 designed to accept a projecting part of complementary shape that forms a stop 14, formed in register with it in the peripheral groove 13 of the fan casing 7.

When one of the cowls 3 is open, its own weight P acts on the cowl 3 that has remained closed which pivots slightly in the direction D about the longitudinal axis A until the stop 14 butts against a lateral wall of the corresponding pocket 15 and thus blocks the rotation of the closed cowl 3 about the axis A. The positions of the pocket 15 of the knife edge 12 and of the corresponding stop 14 of the groove 13 are determined in such a way that the pivot axis 6 about which the cowl 3 is articulated is coplanar with the clearance J between the pocket 15 and the corresponding stop 14. Thus, the dimensions of the clearance J can be small so as to limit the residual pivoting of the cowl 3 in the direction D (before rotation is halted).

Figure 3:
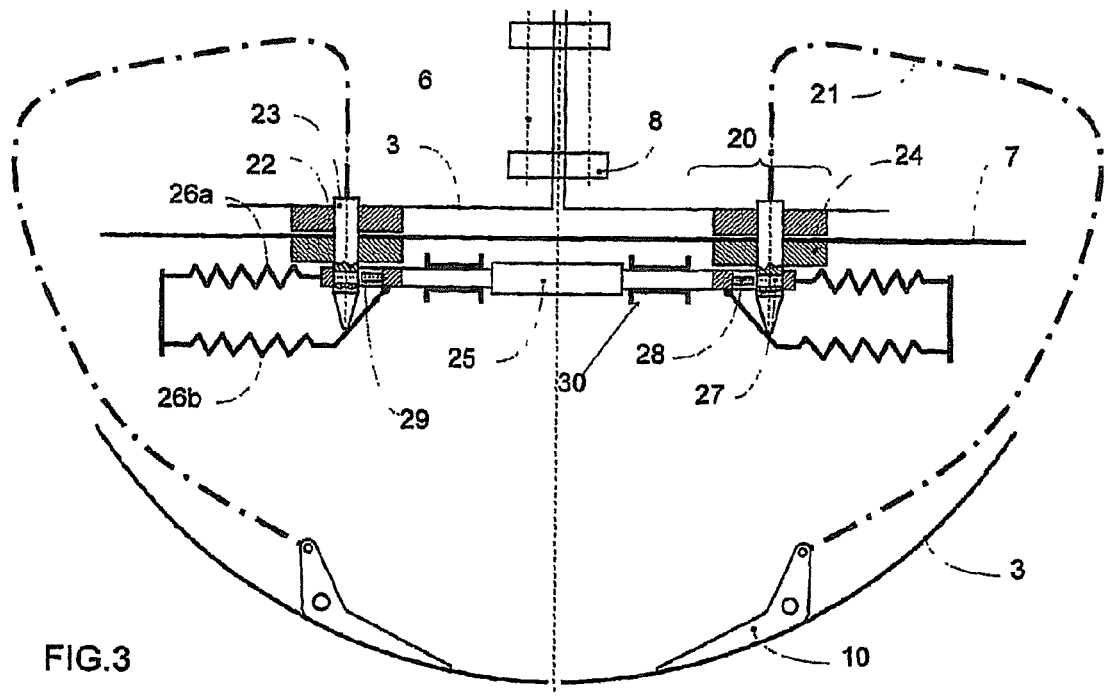
FIGS. 3 and 4 are two schematic views partially from above, in the direction of arrow III of FIG. 2, illustrating two operating positions of a device for locking the opening of the mobile cowls of the nacelle.
Figure 4:
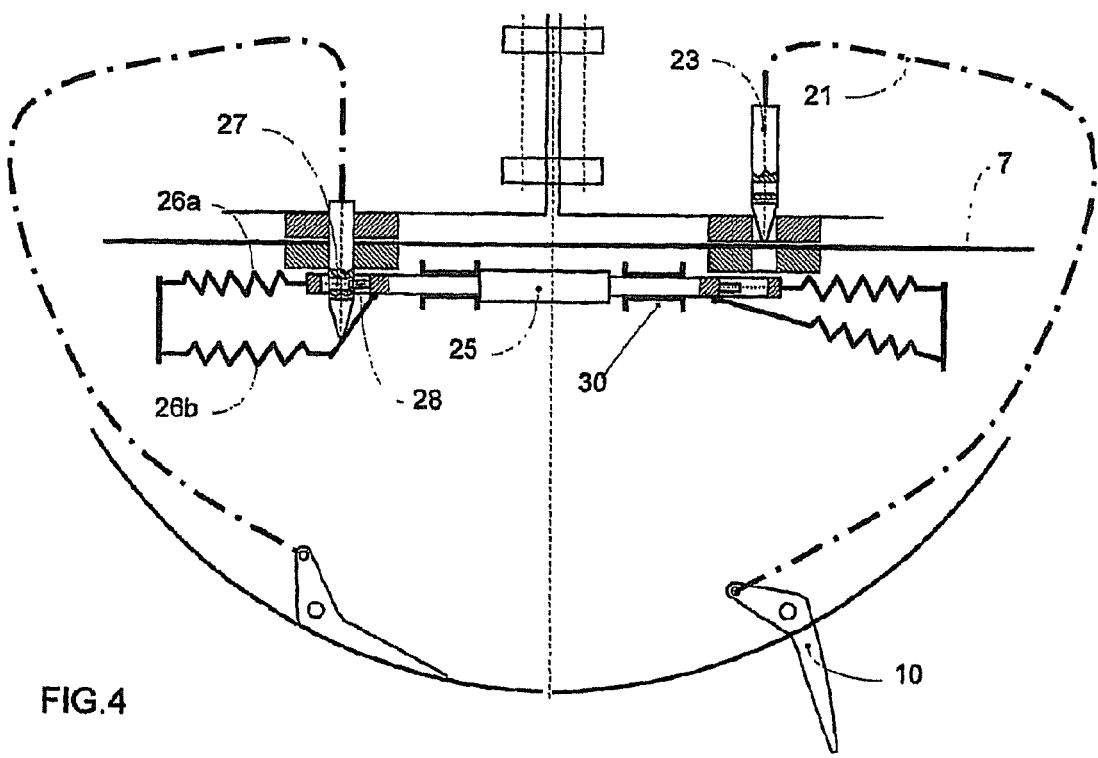

The opening handle 10 allows for deactivation of a device 20 for mechanical locking with the fan casing 7, illustrated in FIGS. 3 and 4, which prevents the corresponding cowl 3 both from opening and from pivoting about the longitudinal axis A of the nacelle.

This locking device 20 comprises an actuating cable 21, operated by the handle 10, designed to move a locking bolt 23 of elongate shape and mounted such that it can slide, parallel to the pivot axis 6, in a housing 22 of complementary shape formed in the upstream structure of the cowl 3, between a position in which it is retracted into its housing 22 and a position in which it projects from this housing 22.

A suitably-shaped orifice 24 is provided in the downstream structure of the fan casing 7 to accept the locking bolt 23 in its protruding position and thus secure the cowl 3 to the fan casing 7.

For safety reasons, the two locking devices 20 of the mobile cowls 3 are interconnected by an indexing device designed such that when one of the cowls 3 is open, the handle 10 of the cowl 3 that has remained closed is immobilized and this cowl is prevented from opening.

This indexing device comprises a rod-shaped slide 25 mounted such that it is able to move in terms of translation, perpendicular to the longitudinal axis A in a recess created in the structure of the fan casing 7. Two guide stops 30 are provided on each side of a central main body of the slide 25.

Two, compression 26a and tension 26b, springs are also provided at each end of the return slide 25 to return it to a position of equilibrium.

At each of its ends the slide 25 has a through-hole 29 which may, depending on the position of the slide 25, be aligned with one of the orifices 24 and accept the corresponding locking bolt 23.

As FIGS. 3 and 4 indicate, the diameter of these through-holes 29 is substantially greater than the diameter of the orifices 24, but the distance separating the distal walls of the two through-holes 29 is substantially equal to the distance separating the distal walls of the orifices 24.

Each of the two through-holes 29 has a radial pin 28 projecting from a proximal wall and able, according to the position of the through-hole 29 before the corresponding orifice 24, to engage in a transverse opening 27 made in the corresponding locking bolt 23 so as to immobilize the latter in the protruding position.

The ends of the locking bolts 23 are pointed so that they engage more readily in the through-holes 29 of the slide 25. The point of each locking bolt 23 in the protruding position presses against the corresponding tension spring 26b so as to load it in tension.

When the locking bolt 23 is in the protruding position, it also presses against the distal wall of the corresponding through-hole 29, so as to compress the corresponding spring 26a.

When the two mobile cowls 3 are closed (see FIG. 3), the two locking bolts 23 are in the protruding position protruding into the orifices 24 of the fan casing 7 and pass through the through-holes 29 in the slide 25 so as to hold the slide 25 in a position of equilibrium with its central main body situated mid-way between its two guide stops 30.

The return springs 26a and 26b at each end of the slide 25 are stressed identically by the locking bolts 23.

When one of the mobile cowls 3 is open, namely when the corresponding locking bolt 23 is retracted into its housing 22, the corresponding return springs 26a and 26b are released so that the slide 25 is repelled in the direction of the locking device 20 of the cowl 3 that has remained closed, until the central main body of the slide 25 is haltered by one of its guide stops 30.

In this configuration (see FIG. 4), the locking bolt 23 of the cowl 3 that has remained closed is immobilized by the radial pin 28 of the corresponding through-hole 29 of the slide 25. Because the slide 25 has moved, the position of the through-hole 29 before the orifice 24 has also effectively changed so that the radial pin 28 enters the transverse opening 27 in the locking bolt 23 of the cowl 3 that has remained closed.

Thus, when one of the mobile cowls 3 is open, the handle 10 on the cowl 3 that has remained closed is itself immobilized by this indexing device.

Figure 7:
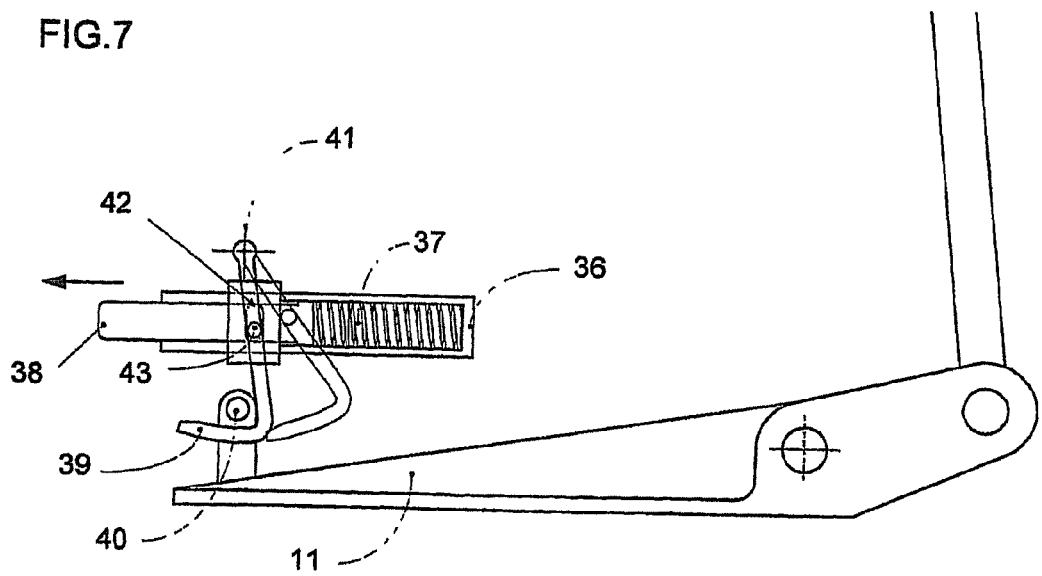
FIG. 7 is an enlarged view of a detail of FIG. 6.

FIGS. 5 to 7 show yet another solution which may be combined with or substituted for the foregoing solutions, for stopping the cowl 3 that has remained closed from rotating about the longitudinal axis A.

It involves providing a locking device 31 comprising an articulated hook 33 designed to catch on a corresponding tab 35 of a fixed anchoring base 34 situated toward the lower part of the peripheral groove 13 of the fan casing 7. The two locking devices 31 are thus positioned facing one another on each side of the fixed anchoring base 34.

This solution makes it possible, when one of the mobile cowls 3 is opened, to eliminate any residual pivoting of the cowl that has remained closed 3 about the longitudinal axis A.

The hook 33 is actuated via a return transmission mechanism 32 known per se, via an opening lever 11 toward the lower part of the corresponding cowl 3. Each lever 11 is articulated in a space provided in the structure of the corresponding mobile cowl 3.

At its end, the lever 11 has a lug 40 on which a blocking hook 39 articulated about a fixed axis 41 provided in the structure of the cowl 3 can catch.

The blocking hook 39 is actuated by a cowl-open signaling rod 38 mounted such that it can slide in a housing 36 formed, between the axis 41 and the end of the hook 39, at right angles to a line formed, when the lever 11 is in a position in which it is blocked by the hook 39, by the pivot axis 41 and the lug 40 of the lever 11.

The rod 38 has a transverse oblong guide slot 42 designed to accept a lateral guide pin 43 of the hook 39, so that a translational movement of the rod 38 under the return action of a compression spring 37 mounted in its housing 36, from a position in which it is retracted into its housing 36 (see FIG. 5) to a position in which it protrudes beyond a longitudinal vertical plane S of symmetry of the nacelle (see FIGS. 6 and 7), is accompanied by a translational movement, in an orthogonal direction, of the guide pin 43 of the hook 39 from a top end to a bottom end of the guide slot 42 of the rod 38 and therefore by a pivoting of the hook 39 about its axis 41 from a withdrawn free position into a position in which it catches on the lug 40 of the lever 11.

As indicated by FIG. 5, when the two cowls 3 are closed, their rods 38 press against one another to keep one another in the position in which they are retracted into their respective housing 36, against the return action of their springs 37. The hooks 39 are therefore in a withdrawn free position and do nothing to prevent actuation of the corresponding levers 11.

When one of the cowls 3 is open (see FIG. 6), the rods 38 no longer rest against one another and this means that the two hooks 39 can pivot into the catching position.

Because the lever 11 of the open cowl 3 has been actuated, the pivoting of the corresponding hook 39 takes place "in empty space" while the hook 39 of the cowl 3 that has been remained closed, as it pivots, catches on the lug 40 of the corresponding lever 11 (see FIG. 7) and prevents the cowl 3 that has remained closed from being opened (unless the open other cowl 3 is closed again).

Figure 8:
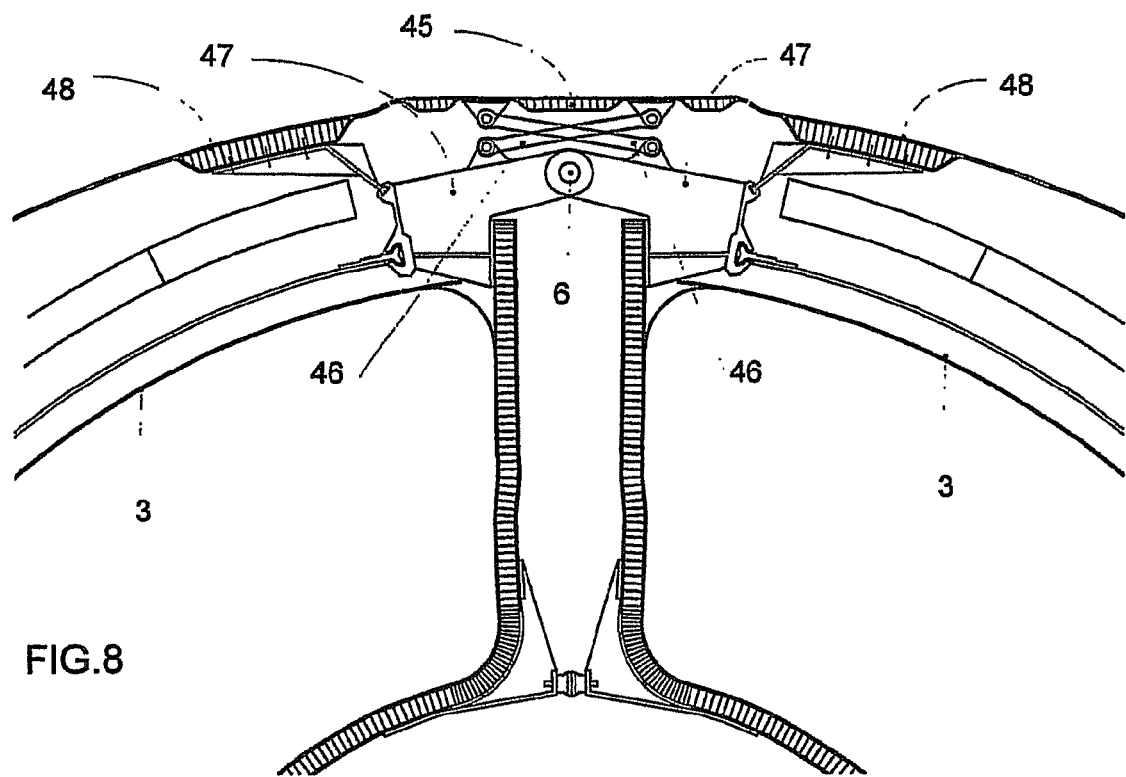
FIGS. 8 and 9 are two views of the rear face of the nacelle depicting two operating positions of a mobile cowling device designed to cover a region in which the mobile cowls are articulated.
Figure 9:
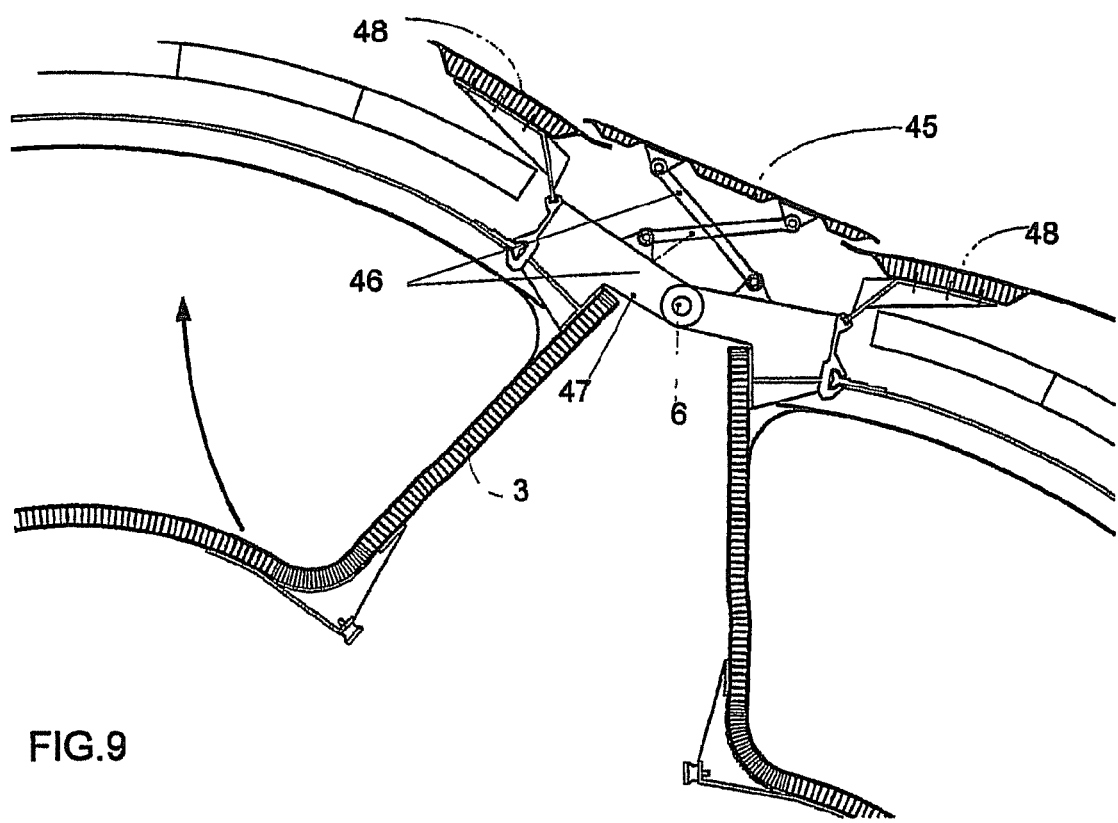

FIGS. 8 and 9 depict one embodiment of the invention in which articulation clevises 47 for the mobile cowls 3 are connected together by a common pivot axis 6, which axis 6 is covered by a mobile aerodynamic cowling device 45.

The cowling 45 is suspended above the common axis 6 by a collection of interlaced link rods 46 linking the clevises 47 about which the mobile cowls 3 are articulated to one another at a point of articulation on an opposite side of the cowling 45.

In FIG. 8, the two mobile cowls 3 are closed, and the cowling 45 provides a joint between the external walls 48 of the two cowls 3.

In FIG. 9, the left-hand (in the drawing) cowl 3 is open and the clevis 47 about which it is articulated pivots about the axis 6. This movement is passed on to the cross strut link rod assembly 46 which raises the cowling 45 above the external walls 48 of the two cowls 3, which slide under the cowling 45 so that they move closer together.

These measures preserve the aerodynamics of the nacelle in flight while at the same time allowing the cowls 3 to be articulated to one another.

Figure 10:
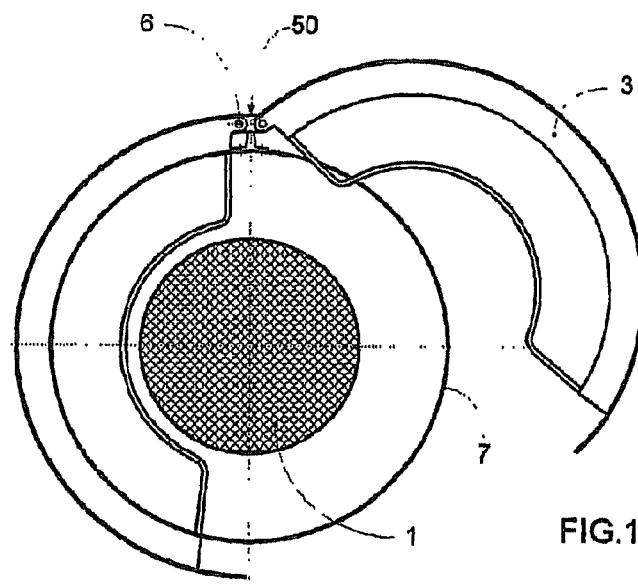
FIG. 10 is a view of the rear face of a nacelle according to yet another embodiment of the invention.
Figure 11:
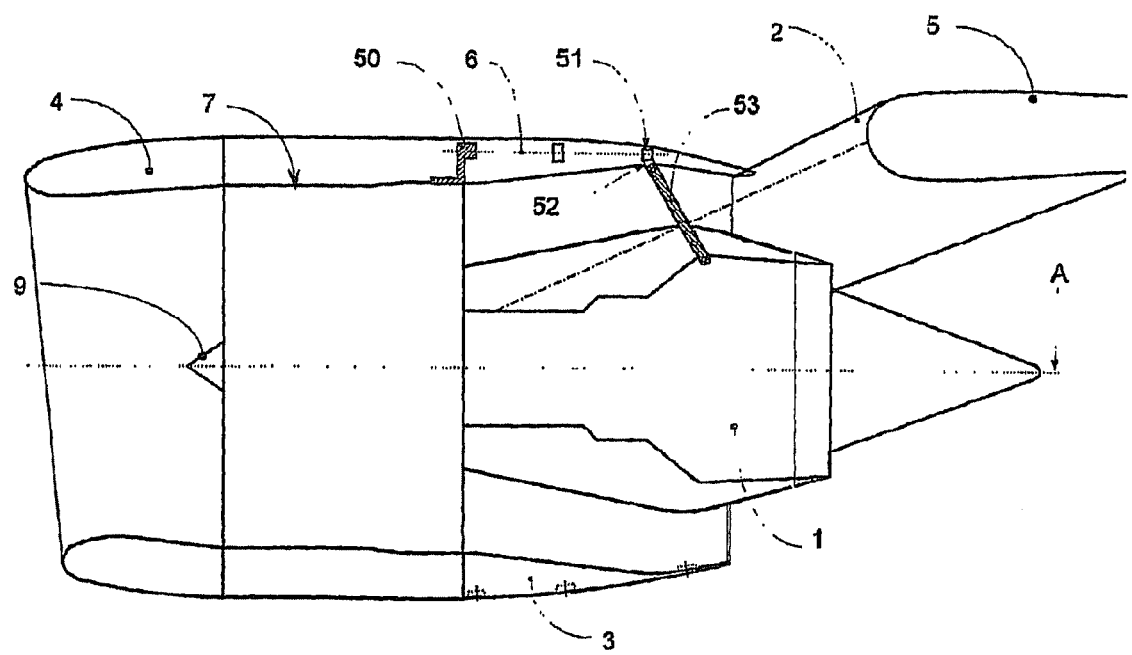
FIG. 11 is a view similar to FIG. 1 of the nacelle of FIG. 10 and depicting a device for permanent connection of the nacelle mobile cowls to a fixed structure of the jet engine.

FIGS. 10 and 11 depict a solution with a permanent connection between the mobile thrust reverser cowls 3 and the fan casing 7.

Each of the cowls 3 is mounted so that it can pivot about a pivot axis 6 created between one and the same post 50 secured to the fan casing 7 and a fitting 51 that connects the two cowls 3 (see FIG. 11).

The fitting 51 comprises two lateral ears 52 connected to the structure of the jet engine 1 by two supporting link rods 53 which thus form a kind of isosceles triangle or trapezium. The two supporting link rods 53 may also be interlaced. Clearance is provided between each supporting link rod 53 and its point of attachment to the structure of the jet engine 1, or to the corresponding lateral ear 52 of the fitting 51, which clearance will be taken up when one or other of the mobile cowls 3 is opened.

Although the invention has been described using particular specific embodiments, it is quite obvious that it is not in any way restricted thereto and that it comprises all technical equivalents of the means described and combinations thereof where these fall within the scope of the invention.

The invention claimed is:

1. A nacelle for a jet engine comprising an air intake upstream of the jet engine, a median section surrounding a fan of the jet engine and a downstream section, the nacelle further comprising at least one pair of mobile cowls positioned one on each side of a longitudinal vertical plane of symmetry of the nacelle and articulated substantially parallel to a longitudinal axis of the nacelle about pivot axes so that they can open to give access to the jet engine,
   wherein the mobile cowls are attached to one another by an attachment means that allow the mobile cowls to be articulated to one another about the pivot axes and through which the weight of one cowl acts, when open, on the other cowl that remains closed, there being no fixed structure above the nacelle to directly support the pivot axes about which the mobile cowls are articulated, and
   wherein each mobile cowl comprises means of permanent connection or means for connecting it temporarily, when closed, in terms of rotation to a fixed structure of the nacelle.

2. The nacelle as claimed in claim 1, wherein the mobile cowls are positioned in the median section of the nacelle.

3. The nacelle as claimed in claim 1, wherein the mobile cowls are positioned in the downstream section of the nacelle.

4. The nacelle as claimed in claim 1, wherein the downstream section of the nacelle comprises a thrust reverser device.

5. The nacelle as claimed in claim 1, wherein said fixed structure of the nacelle is a casing intended to surround the fan of the jet engine.

6. The nacelle as claimed in claim 1, wherein said means of permanent connection comprise a support, fixed to the nacelle fixed structure and which bears the pivot axes about which the cowls are articulated.

7. The nacelle as claimed in claim 6, wherein the pivot axis about which each cowl is articulated is created between the support and an attachment connecting the two cowls, said attachment being connected to the structure of the jet engine by means of at least one supporting link rod.

8. The nacelle as claimed in claim 1, wherein each cowl is connected to the nacelle fixed structure by a knife edge formed in a structure of the cowl and a peripheral groove formed in the nacelle fixed structure, and wherein said means of temporary connection in terms of rotation comprise a cutout created in the knife edge and designed to accept a stop-forming projecting part created in the peripheral groove.

9. The nacelle as claimed in claim 8, wherein the positions of the cutout and of the corresponding stop are determined such that a clearance between the cutout and the stop is coplanar with the axis about which the cowl is articulated.

10. The nacelle as claimed in claim 1, wherein said means of temporary connection in terms of rotation comprise a locking bolt which is slidably mounted in a structure toward an upper part of each cowl, parallel to the axis about which it is articulated, between a retracted position and a position of engagement in a retaining orifice of appropriate shape formed in the nacelle fixed structure, and wherein an indexing slide of elongate shape is mounted such that it can move between said retaining orifices in the upper part of the nacelle fixed structure and comprises means which, should a locking bolt become withdrawn from its retaining orifice, immobilize a locking bolt of the other cowl in an engaged position thus preventing simultaneous opening of both cowls.

11. The nacelle as claimed in claim 10, wherein the locking bolt of each cowl is able to engage in a through-hole made at each end of the slide and to tension elastic return means of the slide so that withdrawal of one of the locking bolts causes the slide to effect a translational movement toward the locking bolt of the cowl that has remained closed and causes the latter to become immobilized by means of a blocking pin projecting from a proximal wall of a corresponding through-hole and able to engage in a transverse opening in the locking bolt.

12. The nacelle as claimed in claim 1, wherein said means of temporary connection in terms of rotation comprise a locking hook which is mounted in a structure in a lower part of each cowl and articulated parallel to the cowl, the locking hook being designed to catch, when the cowl is closed, on an anchoring base fixed to the nacelle fixed structure, a pivoting of the locking hook being brought about by a cowl opening lever mounted to pivot between open and closed positions in a space in the lower part of the cowl, and wherein a blocking hook is pivot mounted and designed to catch on a suitably-shaped radial end of the lever with a view to immobilizing the latter in the closed position, the pivoting of the blocking hook being triggered by a signaling member able to signal the fact that one or other of the cowls is open.

13. The nacelle as claimed in claim 12, wherein each cowl comprises toward the lower part a cowl-open signaling rod mounted such that it can move in terms of translation under an action of a return spring between a position in which it is retracted and a position in which it projects with respect to the longitudinal vertical plane of symmetry of the nacelle, the signaling rods of the two cowls coming, when these cowls are closed, to rest against one another so as to keep one another in the retracted position, and in that said blocking hook exhibits a lateral guide pin mounted to slide in an oblong guide slot formed in the rod so that a translational movement of the rod is accompanied by a pivoting of the hook.

14. The nacelle as claimed in claim 1, wherein the cowls are articulated by articulation clevises about a common pivot axis, and wherein a mobile cowling device supported above the common pivot axis and connected to the articulation clevises of the cowls by a collection of interlaced pivot link rods covers a region in which the cowls are articulated and provides a joint between external walls of the cowls so as to preserve aerodynamics of the nacelle when the cowls are closed.

15. The nacelle as claimed in claim 1, wherein the weight of one cowl, when open, acts to rotate about a longitudinal axis of the nacelle, the other cowl that remains closed until a stop which is formed in a peripheral groove of a fan casing butts a lateral wall of the corresponding pocket formed in a knife edge of the mobile cowls.

\* \* \* \* \*